3,825,528
CRYSTALLINE KANAMYCIN TETRA-
HYDROCHLORIDE
John Edward Vogan and Edmund Stanley Granatek,
Syracuse, N.Y., assignors to Bristol-Myers Company,
New York, N.Y.
Filed Aug. 20, 1970, Ser. No. 65,686
Int. Cl. C07c 12/18
U.S. Cl. 260—210 K  1 Claim

ABSTRACT OF THE DISCLOSURE

The specification discloses the preparation of crystalline forms of the mono-, di-, tri-, and tetrahydrochloride salts of kanamycin and therapeutic composition thereof.

BACKGROUND OF THE INVENTION

This invention is directed to an antibiotic substance and to methods for the production thereof.

Kanamycin is an antibiotic obtaned by fermentation which has well-established utility in the treatment of infectious diseases.

It has been demonstrated, clinically and experimentally, that kanamycin is a valuable and efficacious antibiotic for the treatment of infections caused by Gram-positive, Gram-negative, and mycobacteria. Kanamycin is an outstanding therapeutic agent for the treatment of gonorrhea. It has been established that even refractory cases respond to single-dose intramuscular therapy with two grams of kanamycin. The only forms of kanamycin now available for therapeutical use are the sulfate salts which, unfortunately, are of limited solubility in water. The solubility and viscosity characteristics of these salts require that the effective dose be administered in a relatively large volume which has been found to cause significant discomfort to the patient if administered at one site. The alternative technique, involving administration at several sites, is medically inconvenient and is not completely free of discomfort, since even then the volume of medicament is substantial, and the viscosity of the solution makes syringability and dissipation in the tissue difficult.

Accordingly, there is a substantial need for the development of a new and more soluble form of kanamycin which will permit the formulation of therapeutically effective doses without the heretofore encountered problems of solubility and viscosity.

An object of this invention is to make available salts of kanamycin which have improved solubility and viscosity characteristics. Another object of the invention is to provide a salt of kanamycin which can be used to provide formulations of various pH levels without the need to use separate additions of acids to adjust the pH. A further object of the invention is to provide a process for preparing crystalline salts of kanamycin hydrochloride having from 1 to 4 moles of hydrochloric acid per mole of kanamycin base. A still further object of the invention is to provide therapeutic formulations of kanamycin having improved viscosity characteristics.

It has now been found that therapeutic formulations of kanamycin can be prepared through the use of crystalline kanamycin hydrochloride and that these formulations have improved solubility and viscosity characteristics which have them highly desirable and useful in the treatment, particularly by hypodermic or parenteral administration, of infectious diseases. For example, the therapeutic equivalent of a two-gram dose of kanamycin base, which requires a volume of about six milliliters of water when given as the sulfate, can be adiministered as the tetrahydrochloride in a volume of about four milliliters, thus achieving a volume reduction of about one third.

The parent antibiotic kanamycin is disclosed and claimed in United States Pat. 2,931,798, issued to H. Umezawa et al. on Apr. 5, 1960. This patent discloses the preparation by fermentation of both the A and B forms of kanamycin.

It has now been found that kanamycin can be prepared and recovered as a crystalline hydrochloride salt form, having a selective degree of neutralization. The crystalline forms of the kanamycin hydrochloride salts are characterized by improved physical and chemical properties such as solubility and purity and are, therefore, particularly suitable for use in the medical field.

Broadly, the various hydrochloride salts of kanamycin are prepared from a solution of kanamycin base. This solution need not be a pure solution but can be a slurry in which the liquid phase contains some dissolved kanamycin. The pH of the kanamycin-containing solution is then adjusted with hydrochloric acid to the natural pH of the particular species which is to be precipitated.

Kanamycin hydrochloride can be prepared as a mono-, di-, tri-, or tetrahydrochloride salt by slurrying kanamycin base in water and adding hydrochloride acid to a pH level corresponding to successive neutralization of the amino groups of the kanamycin base. Bringing the pH of the admixture to about 4 provides complete neutralization of the amine groups. The trichloride is prepared at a pH of about 6.4 to 6.5 while the di- and monohydrochloride salts are formed at about pH 7.2 to 7.4 and 8.1 to 8.3, respectively. Accordingly, the respective hydrochlorides are formed by adjusting the pH of the solution to the natural pH of the desired species and then precipitating the desired salt.

The crystalline product which is soluble in the aqueous medium in which it is formed can be obtained by precipitation and crystallization by conventional techniques. Water-miscible solvents can be added to the solution in order to bring about a condition approaching supersaturation. Any water-miscible solvent in which the kanamycin hydrochloride is relatively insoluble can be used. Illustrative solvents include methanol, ethanol, acetone, dimethylformamide, n-butane, isopropanol, and the like, including mixtures of these solvents.

The solvent is added slowly to the aqueous solution at a temperature from about room temperature up to the boiling point of the solvent, preferably up to about 60° C. Depending on the condition of temperature, choice of solvent, speed of addition, and the like, the precipitate will form as the crystalline material or as an oil-like semi-solid which spontaneously converts to the crystalline form when left in contact with the supernatant solvent. The use of slightly elevated temperatures has been found to facilitate the crystal formation. Broadly, the temperature at which the salts may be formed may range from about 20° C. to about 60° C., depending on the choice of solvent and preferably from 20° C. to about 50° C.

Crystal formation can be facilitated by adding seed crystals of the desired hydrochloride salt to the solution before precipitation begins.

In precipitating the hydrochloride, the precipitating solvent is added in an amount sufficient to obtain substantially complete recovery of the kanamycin base present. Suitable ratios of water to solvent are not narrowly critical, provided that the solubility of the salt in the solvent mixture is exceeded. It has been found that kanamycin hydrochloride can be effectively precipitated from a water-isopropanol mixture where the ratio of water to alcohol is about 1:10 and from a solvent comprising water, methanol, and ethanol where the water to alcohol ratio is about 1:16, the ratio of methanol to ethanol being about 1:1.

The improved solubility and viscosity characteristics of kanamycin hydrochloride are illustrated by comparing the flow rate and syringability of various formulations. Three kanamycin solutions were formulated to provide a standard dose of about 525 milligrams per milliliter of kanamycin base activity at pH 4.0. The first was made by slurrying kanamycin sulfate in water and adjusting the pH to 4.0 with concentrated hydrochloric acid. The second was made by simply dissolving kanamycin tetrahydrochloride crystals in water. The natural pH of the resulting solution was 4.0. The third was made by slurrying kanamycin sulfate in water and adjusting the pH to 4.0 with sulfuric acid. Viscosity was determined by measuring the flow time from the 0 to the 4 milliliter mark of a five milliliter pipette. Syringability was determined by filling a hypodermic syringe through a 22-gauge needle. The results are shown in Table I, below.

TABLE I

Viscosity (flow time): Syringability
(1) 6 sec., 6 sec., 6.5 sec. ____ Difficult to fill syringe.
(2) 4.5 sec., 4.5 sec., 5.0 sec. _ Flows readily.
(3) 25 sec., 27 sec., 25.0 sec. _ Does not flow—too viscous.

Only the second solution had a viscosity low enough for use as an injectable at the desired potency level. Attempts at forming similar salts with phosphoric, acetic, and citric acid gave negative results due to low solubility and/or high viscosity.

The crystalline kanamycin salts are readily soluble in water and when dissolved in water provide solutions which have a pH characteristic of the particular solute. For example, when the tetrahydrochloride salt is dissolved in water at use concentration, i.e., at about 500 mg. of potency per ml. of solution, the pH is about 4 to 4.2. It has been found that the pH does not vary much as the concentration ranges from about 100 to about 500 mg. of potency per ml. of solution.

Similarly, the tri, di, and monohydrochloride salts provide solutions having a pH of about 6.6, 7.3, and 8.3, respectively.

For convenience, a solution having a potency of about 500 mg. of kanamycin base activity per ml. is hereafter referred to as a standard solution.

The tetrahydrochloride crystals were identified by various techniques, including X-ray analysis, and the following powder diffraction pattern was obtained using Cu++ radiation with a nickel filter in a General Electric powder diffraction camera, in which the powder sample was contained in a 0.5 mm. capillary.

LINE SPACINGS AND RELATIVE INTENSITIES OF X-RAY DIFFRACTION PATTERNS FOR KANAMYCIN TETRAHYDROCHLORIDE

| Interplanar Spacings, $dA$.: | Relative intensities, $1/1_1$ |
|---|---|
| 10.0 | .30 |
| 8.2 | .30 |
| 7.3 | .90 |
| 6.75 | .50 |
| 6.40 | .30 |
| 5.85 | .50 |
| 5.5 | .50 |
| 5.3 | .25 |
| 5.0 | .30 |
| 4.75 | .40 |
| 4.25 | .70 |
| 4.0 | .50 |
| 3.75 | 1.00 |
| 3.60 | .20 |
| 3.50 | .40 |
| 3.2 | Band .40 |
| 3.0 | .30 |
| 2.77 | .25 |
| 2.70 | .10 |
| 2.63 | .30 |
| 2.55 | .10 |
| 2.48 | .10 |
| 2.43 | .30 |
| 2.3 | Band .20 |
| 2.24 | Band .20 |
| 2.1 | Band .10 |
| 2.03 | .30 |
| 1.89 | .20 |
| 1.87 | .20 |
| 1.82 | .10 |
| 1.77 | Band .10 |
| 1.70 | .10 |
| 1.68 | .10 |
| 1.64 | .10 |
| 161. | .10 |
| 1.57 | .10 |
| 1.54 | .10 |
| 1.52 | .10 |

The following table sets forth characteristic physical properties of kanamycin tetrahydrochloride prepared as described herein.

| Lot: | pH at 25° C., 20 mg./ml. | Melting point, decomposed, °C. | Solubility in H₂O at 25° C., gm./ml. | Color |
|---|---|---|---|---|
| 1 | 4.1 | 215 | 2 | White cream. |
| 2 | 4.0 | 215 | 2 | Do. |
| 3 | 4.0 | 215 | 2 | Do. |
| 4 | 4.0 | 215 | 2 | Do. |

ASSAY FOR POTENCY OF KANAMYCIN TETRAHYDROCHLORIDE

| Lot: | Estimate, mig./mg. | Assay result, mig./mg. |
|---|---|---|
| 1 | 730 | 725 |
| 2 | 730 | 725 |
| 3 | 730 | 730 |
| 4 | 730 | 735 |

These lots of kanamycin tetrahydrochloride were characterized by rod-shaped crystals with an optical rotation of $[\alpha]_D^{25} = 108.3°$ and a theoretical molecular weight of 626.5.

Kanamycin tetrahydrochloride has been found to have a toxicity ($LD_{50}$ in mice) which is comparable to the toxicity of kanamycin sulfate.

Example 1

Crystalline kanamycin tetrahydrochloride was prepared by dissolving 200 grams of kanamycin base in a mixture of 130 mls. of concentrated hydrochloric acid and 100 mls. of water. To the resulting solution, there was added about 15 grams of activated charcoal, and the mixture was stirred gently at 37° C. for about 30 minutes. Three hundred and thirty milliliters of methanol was then added to the mixture and the charcoal removed by filtration. The resulting clear solution was warmed to about 50° C. and 330 mls. of isopropanol added to the solution. The solution was allowed to cool slowly with periodic stirring until crystallization was complete. The crystalline precipitate was separated by filtration and dried under vacuum at 40° C. The yield was 230 grams (93.3% of theoretical) of crystalline material which gave a solution having a pH of 4.2 when dissolved in water at a concentration sufficient to provide about 500 mg. of kanamycin base activity per ml. of solution, i.e., a standard solution.

Example 2

Crystalline kanamycin dihydrochloride was prepared by dissolving 30 grams of kanamycin base in 20 mls. of water. To the resulting solution, there was added 9.76 mls. of concentrated hydrochloric acid, slowly and with stirring. Fifty mls. of methanol was added to the solution which was then filtered. The filtered solution was heated to 50° C. Fifty mls. of isopropanol was heated to 50° C. and slowly added to the filtered solution with stirring. Stirring was continued for ten minutes. The resulting solution was placed in an ice room for two hours, after which time crystallization was nearly complete. After being held overnight at about 4° C., the crystalline product was separated by filtration and dried at 40° C. under vacuum. This material gives a solution of pH 7.3 when dissolved in water at a concentration sufficient to provide a standard solution. Chloride analysis indicated 11.89% to 12.07% (12.6% theoretical).

Example 3

Kanamycin trihydrochloride was prepared by slurrying about 30 grams of kanamycin base in 15 milliliters of water and slowly adding thereto about 14.65 mls. of concentrated hydrochloric acid. After all the kanamycin had dissolved, 50 ml. of methanol was added to the solution, and the solution was filtered to remove any debris. Following filtration, the kanamycin hydrochloride began to form crystals. The crystals were separated, washed with about 30 mls. of methanol, and dried under vacuum. The yield was 31.2 grams of rod-like crystals. When dissolved in water at standard solution concentration, the crystals gave a pH of 6.6. The crystals had an analysis of 9.12% nitrogen and 15.45% chloride. Theoretical values for nitrogen and chloride in kanamycin trihydrochloride (as the monohydrate) are 9.20% and 17.49%, respectively.

Example 4

The monohydrochloride salt of kanamycin was obtained by slurrying about 30 grams of kanamycin base in 30 mls. of water and adding thereto 4.88 mls. of concentrated hydrochloric acid while maintaining the temperature of the reaction mixture between 20° C. and 30° C. About 50 mls. of methanol were then added to the resulting solution. The mixture was stirred for five minutes and then filtered.

An admixture of 50 mls. of methylene chloride and 80 mls. of isopropanol was added to the filtered solution, and the resulting mixture was heated on a steam bath, with stirring, to a temperature of about 60° C. at which point crystallization began. The mixture was removed from the heat and allowed to cool and crystallize.

The solution was reheated to from 50° C. to 60° C. and 20 mls. of isopropanol were slowly added. The solution was then left at room temperature for about 15 hours. Then it was filtered, the crystals washed with methanol, and dried under vacuum to provide 24.8 grams of a product of small needle-like crystals. Bioassay showed the product to have a potency of 890 mcg./mg. When dissolved in water, the crystalline product provides a pH of 8.3.

Chemical analysis on the product showed 10.74% nitrogen and 7.20% chloride as compared with theoretical values of 10.65% and 6.73%, respectively.

Example 5

Kanamycin tetrahydrochloride was also prepared by slurrying kanamycin base in water and adjusting the pH of the slurry to 4.0 with concentrated hydrochloric acid. Two mls. aliquot portions of the resulting solution were taken and placed in a series of tubes. Water-miscible solvents were used to provide a final volume of 12 mls. to 14 mls. Kanamycin tetrahydrochloride crystals were formed with the following solvents: ethanol, acetone, dimethylformamide, n-butanol and isopropanol. Infrared analysis of the crystals was consistent with the desired product.

Example 6

A therapeutic composition was prepared by blending 70 mls. of concentrated hydrochloric acid with 30 mls. of water. The resulting admixture was cooled to about 25° C. and admixed with 0.20 gram of anhydrous citric acid, 0.135 gram of methyl p-hydroxybenzoate and 0.015 gram of propyl p-hydroxybenzoate. The temperature of the solution was maintained between 20° C. and 30° C. while adding thereto kanamycin base. When about 90 grams of kanamycin base had been added, 0.99 grams of sodium meta bisulfite was added followed by the balance of a total of 115 grams of kanamycin base. The pH of the resulting solution was adjusted to 4.5 and the volume made up to 200 mls. The solution was then filtered and packaged in 4 ml. lots.

The amount of kanamycin base used included an excess of about 5% based on a potency of 910 micrograms per milligram.

Example 7

A therapeutic composition was prepared by dissolving 0.102 gram of methyl p-hydroxybenzoate, 0.0113 gram of propyl p-hydroxybenzoate, 0.15 gram of anhydrous citric acid, and 1.5 grams of xylene hydrochloride in 55 mls. of water. To the resulting solution there was added 0.75 gram of sodium metabisulfite and 108 grams of crystalline kanamycin tetrahydrochloride. The pH of the solution was adjusted to 4.5 with normal sodium hydroxide, and the volume made up to 150 mls. with deionized water.

We claim:
1. Crystalline kanamycin tetrahydrochloride characterized by solubility in water of about 2 grams per milliliter and the following X-ray diffraction pattern:

| Interplanar Spacing; $dA$.: | | Relative Intensities, $1/1_1$ |
|---|---|---|
| 10.0 | | .30 |
| 8.2 | | .30 |
| 7.3 | | .90 |
| 6.75 | | .50 |
| 6.40 | | .30 |
| 5.85 | | .50 |
| 5.5 | | .50 |
| 5.3 | | .25 |
| 5.0 | | .30 |
| 4.75 | | .40 |
| 4.25 | | .70 |
| 4.0 | | .50 |
| 3.75 | | 1.00 |
| 3.60 | | .20 |
| 3.50 | | .40 |
| 3.2 | Band | .40 |
| 3.0 | | .30 |
| 2.77 | | .25 |
| 2.70 | | .10 |
| 2.63 | | .30 |
| 2.55 | | .10 |
| 2.48 | | .10 |
| 2.43 | | .30 |
| 2.38 | | .30 |
| 2.3 | Band | .20 |
| 2.24 | Band | .20 |
| 2.1 | Band | .10 |
| 2.03 | | .30 |
| 1.89 | | .20 |
| 1.87 | | .20 |
| 1.82 | | .10 |
| 1.77 | Band | .10 |
| 1.70 | | .10 |
| 1.68 | | .10 |
| 1.64 | | .10 |
| 1.61 | | .10 |
| 1.57 | | .10 |
| 1.54 | | .10 |
| 1.52 | | .10 |

(References on following page)

References Cited

UNITED STATES PATENTS

| | | | |
|---|---|---|---|
| 2,931,798 | 4/1960 | Umezawa et al. | 260—210 K |
| 2,936,307 | 5/1960 | Johnson et al. | 260—210 K |
| 2,967,177 | 1/1961 | Johnson et al. | 260—210 K |
| 3,032,547 | 5/1962 | Rothrock et al. | 260—210 K |

OTHER REFERENCES

Maeda et al. "Jour. of Antibiotics, Ser. A," Vol. 10, Sept. 1957, pp. 228–231.

JOHNNIE R. BROWN, Primary Examiner

U.S. Cl. X.R.

424—181